United States Patent
Deman et al.

(10) Patent No.: US 6,674,916 B1
(45) Date of Patent: Jan. 6, 2004

(54) INTERPOLATION IN TRANSFORM SPACE FOR MULTIPLE RIGID OBJECT REGISTRATION

(75) Inventors: Bruce Van Deman, Indianapolis, IN (US); Louis K. Arata, Mentor, OH (US); Ruhul Quddus, Philadelphia, PA (US)

(73) Assignee: Z-Kat, Inc., Hollywood, FL (US)

( * ) Notice: Subject to any disclaimer, the term of this patent is extended or adjusted under 35 U.S.C. 154(b) by 0 days.

(21) Appl. No.: 09/419,949

(22) Filed: Oct. 18, 1999

(51) Int. Cl.[7] .................................................. G06K 9/36
(52) U.S. Cl. ....................... 382/276; 382/128; 600/310; 600/426
(58) Field of Search ................................ 382/276, 281, 382/291; 600/310, 426

(56) References Cited

U.S. PATENT DOCUMENTS

| | | | | |
|---|---|---|---|---|
| 5,495,539 A | * | 2/1996 | Sieverding ................... | 382/276 |
| 5,517,990 A | | 5/1996 | Kalfas et al. | |
| 5,891,034 A | * | 4/1999 | Bucholz ...................... | 600/426 |
| 5,967,982 A | * | 10/1999 | Barnett ........................ | 378/206 |
| 5,991,464 A | * | 11/1999 | Hsu et al. .................... | 348/448 |
| 6,049,622 A | * | 4/2000 | Robb et al. ................. | 382/128 |
| 6,061,467 A | * | 5/2000 | Michael ....................... | 382/151 |
| 6,236,875 B1 | * | 5/2001 | Bucholz et al. ............. | 600/407 |
| 6,246,898 B1 | * | 6/2001 | Vesely et al. ............... | 600/424 |
| 6,266,453 B1 | * | 7/2001 | Hibbard et al. ............. | 382/131 |

OTHER PUBLICATIONS

Picker International, Inc., "ViewPoint," promotional brochure, pp. 1–11, 1994.
Picker International, Inc., "ViewPoint Standard Surgical Instruments," promotional brochure, pp 1997.
Picker International, Inc., "ViewPoint," promotional brochure.
D. W. Kormos, "Image–Guided Surgery Attains Clinical Status," *Diagnostic Imaging*, Sep. 1994.
Second Annual North American Program on Computer Assisted Orthopaedic Surgery, presented by Center for Orthopaedic Research and Department of Continuing Medical Education, UPMC Shadyside, Pittsburgh, Pennsylvania, pp. 1–99, Jun. 18–20, 1998.
Proceedings of the First Internatninal Symposium on Medical Robotics and Comptuer Assisted Surgery, vol. 2, Pittsburgh, Pennsylvania, Sep. 22–24, 1994.
Sofamor Danek, "Image–Guided Surgery System," promotional brochure, 1997.

* cited by examiner

Primary Examiner—Samir Ahmed
Assistant Examiner—Anand Bhatnagar
(74) Attorney, Agent, or Firm—Fay, Sharpe, Fagan, Minnich & McKee, LLP

(57) ABSTRACT

A method of mapping a chosen point in real space to its corresponding location in image space includes obtaining a diagnostic medical image of a subject including multiple rigid objects, and individually computing separate transforms which register each of the rigid objects in real space with their corresponding locations in image space. After choosing a target point in real space, the target point is mapped to image space using a designated transform. A number of the rigid objects are selected which are closest to the target point in image space, and an interpolated transform is generated from the separate transforms which correspond to the selected rigid objects. The target point is re-mapped in image space using the interpolated transform, and the interpolated transform is set as the designated transform for subsequent mappings.

19 Claims, 5 Drawing Sheets

INTERPOLATION IN TRANSFORM SPACE FOR MULTIPLE RIGID OBJECT REGISTRATION

BACKGROUND OF THE INVENTION

The present invention relates to the medical diagnostic imaging and surgical arts. It finds particular application in conjunction with image guided surgery (IGS), and will be described with particular reference thereto. However, it is to be appreciated that the present invention is also amenable to other like applications.

Medical diagnostic imaging is a valuable tool for obtaining accurate visualization of a particular patient's internal anatomy and/or pathology in a minimally invasive manner. Prior to a medical procedure, three-dimensional (3D) diagnostic image data of the brain, spinal cord, and/or other anatomy of interest is often generated by CT scanners, magnetic resonance imaging (MRI) scanners, gamma cameras, and other medical diagnostic imaging equipment. Typically, these imaging modalities provide structural detail with a resolution of a millimeter or better. Reconstructed images of the patients anatomy are then used by medical personnel to aid in navigating through and/or around various anatomical structures.

Commonly, an IGS system includes a computer, active and/or passive tools carrying infra-red (IR) emitting diodes or reflective spheres, a stereoscopic optical tracking system, and a tool interface device. The IR rays emitted by the active tool (or reflected in the case of a passive tool) are detected by charge-coupled device (CCD) cameras mounted on an optical unit. Using the detected IR rays, the system tracks and/or localizes the position and orientation of the tool in a 3D coordinate space which is registered with that of the 3D image data. In this manner, the position and trajectory of a tool relative to imaged anatomy is determined or visualized and used to aid in the maneuvering of the tool and/or the placement of a tool guide.

Various frameless stereotactic IGS procedures have been developed which take advantage of the 3D image data of the patient. These procedures include guided-needle biopsies, shunt placements, craniotomies for lesion or tumor resection, and the like. Another area of frameless stereotaxy procedure which requires extreme accuracy is spinal surgery, including screw fixation, fracture decompression, and spinal tumor removal.

In spinal screw fixation procedures, for example, surgeons or other medical personnel drill and tap a hole in spinal vertebra into which a screw is to be placed. The surgeon often relies heavily on his own skill in placing and orienting the bit of the surgical drill prior to forming the hole in the vertebra. Success depends largely upon the surgeon's estimation of anatomical location and orientation in the operative field. Unaided, this approach can lead to less than optimal placement of screws which in turn may injure nerves, blood vessels, or the spinal cord.

Nevertheless, use of a stereotactic IGS procedure presents certain problems and/or complications of its own. For example, one problem is accurately registering anatomy of a subject in real space with its corresponding image in image space. This is especially troublesome in cases where the relative spatial relationships of various anatomical features of interest have shifted or are otherwise changed in comparison to when the image was obtained.

In spinal procedures, for example, it is extremely difficult to ensure that the individual vertebrae of the subject are in the exact same relative position to one another when the procedure is performed as when the image is obtained. This is particularly the case when imaging is done at some time prior to the procedure being performed, and the subject does not remain completely immobilized in the interim. Accordingly, a transform which registers one vertebrae in real space with its corresponding image in image space does not accurately map the other vertebrae to their corresponding images in image space. Likewise, using the same transform to map the position and/or orientation of a surgical tool in the vicinity of different vertebrae, results in less than optimal image space registration of the surgical tool with respect to the nearby anatomy and/or inaccurate visualization of the relative spatial relationship between the surgical tool and the nearby anatomy.

The present invention contemplates a new and improved registration technique which overcomes the above-referenced problems and others.

SUMMARY OF THE INVENTION

In accordance with one aspect of the present invention, a method of mapping a chosen point in real space to its corresponding location in image space is provided. The method includes obtaining a diagnostic medical image of a subject including multiple rigid objects, and individually computing separate transforms which register each of the rigid objects in real space with their corresponding locations in image space. After choosing a target point in real space, the target point is mapped to image space using a designated transform. A number of the rigid objects are selected which are closest to the target point in image space, and an interpolated transform is generated from the separate transforms which correspond to the selected rigid objects. The target point is re-mapped in image space using the interpolated transform, and the interpolated transform is set as the designated transform for subsequent mappings.

In accordance with a more limited aspect of the present invention, the interpolated transform is generated using nearest neighbor interpolation.

In accordance with a more limited aspect of the present invention, the number of rigid objects selected is two.

In accordance with a more limited aspect of the present invention, the number of rigid objects selected is one.

In accordance with a more limited aspect of the present invention, the method is repeated for multiple target points such that each target point is ultimately mapped to image space using its own corresponding interpolated transform.

In accordance with a more limited aspect of the present invention, the target points selected define a surgical tool in real space.

In accordance with a more limited aspect of the present invention, the method further includes rendering an image representation of the surgical tool in image space in accordance with where the target points are mapped to in image space.

In accordance with a more limited aspect of the present invention, when a relative spatial relationship between the multiple rigid objects in real space does not match that of the multiple rigid objects in image space, then the image representation of the surgical tool in image space appears deformed in relation to the surgical tool in real space.

In accordance with a more limited aspect of the present invention, a relative spatial relationship of each target point to its nearest rigid object in image space is substantially identical to that of each target point to its nearest rigid object in real space.

In accordance with another aspect of the present invention, an image guided surgery system is provided. It includes a support on which a subject is positioned in real space, and a human viewable display on which is rendered, in an image space, an image representation of anatomy of the subject. The anatomy includes a plurality of rigid objects. Also included is a surgical tool having points thereon from which radiant energy is directed. A detector unit tracks an orientation and position of the surgical tool in real space via the radiant energy directed therefrom, and a processor maps the orientation and position of the surgical tool from real space into image space using an interpolated transform. The interpolated transform is interpolated from a number of rigid object transforms which each register one of the plurality of rigid objects in real space to its corresponding image in image space.

In accordance with a more limited aspect of the present invention, based on the processor's mapping, the surgical tool is visualized on the human viewable display along with the image representation of anatomy of the subject.

In accordance with a more limited aspect of the present invention, as visualized on the human viewable display, the surgical tool is deformed to compensate for differences in relative spatial positioning between the rigid objects in real space as compared to image space.

In accordance with a more limited aspect of the present invention, the interpolated transform is interpolated from those rigid object transforms corresponding to a number of the rigid objects closest to where the surgical tool is being mapped to by the processor.

In accordance with a more limited aspect of the present invention, the interpolated transform is interpolated using nearest neighbor interpolation.

In accordance with a more limited aspect of the present invention, the rigid objects are vertebrae.

One advantage of the present invention is accurate mapping of points in real space to image space in the presence of multiple rigid object registration between the two spaces.

Another advantage of the present invention is the preservation of the relative orientations and positions of mapped target points with respect to their nearby anatomy.

Yet another advantage of the present invention is smoothly varying registration for multiple rigid objects.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
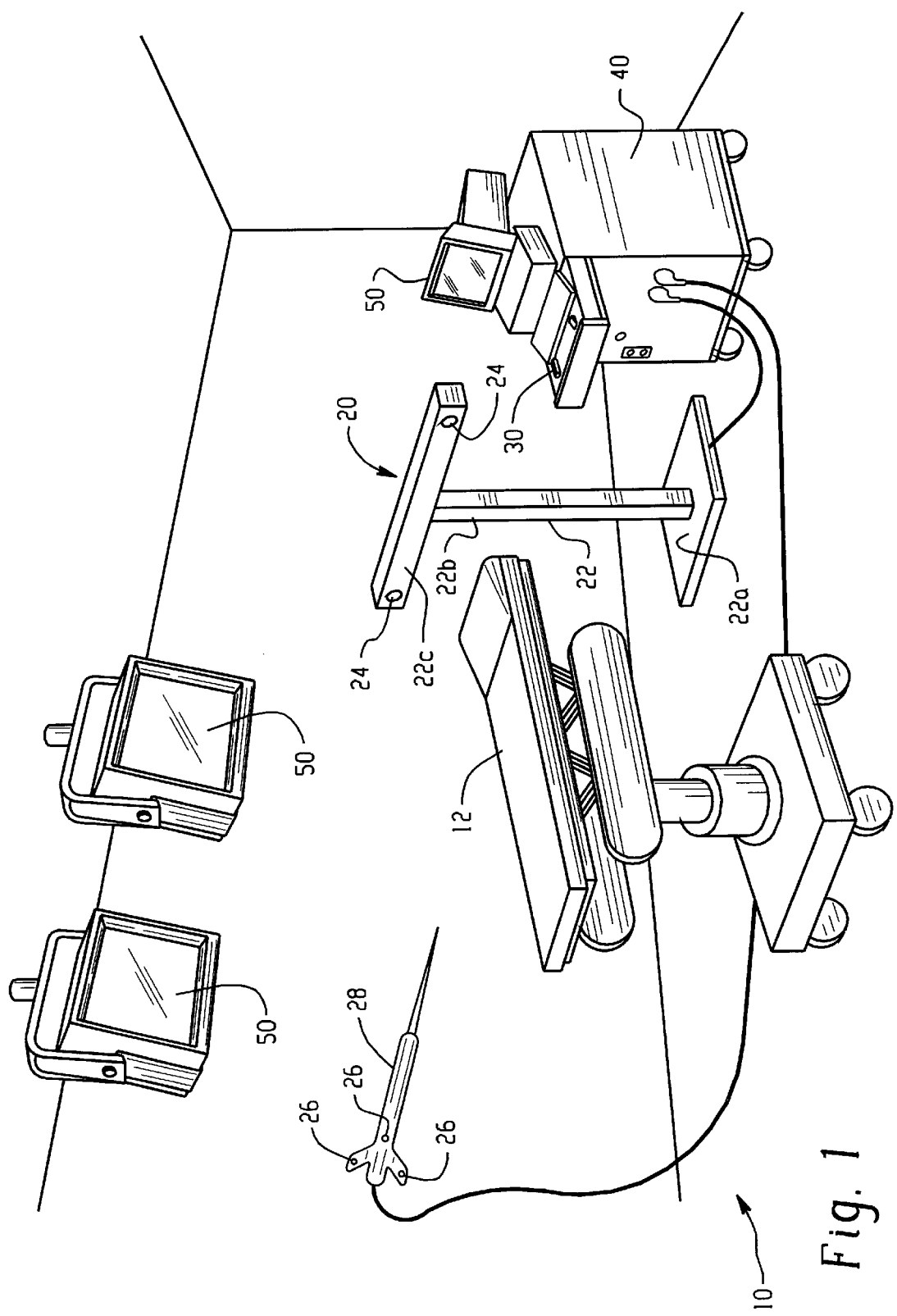
FIG. 1 is a diagrammatic illustration of an image guided surgery system in accordance with aspects of the present invention.

With reference to FIG. 1, an IGS system is indicated generally by reference numeral 10. In use, a subject, such as a human patient, is received on an operating table, couch, or other subject support 12 and appropriately positioned within the operating room. Securing structures, such as a head clamp (not shown) or patient restraint straps (not shown), securely position or fix at least a portion of the subject under consideration to the subject support 12.

A detector unit 20 is positioned in relationship to the patient such that its precise location and orientation within a coordinate system of the subject or subject support 12 is maintained throughout the medical procedure being performed. In the illustrated embodiment, the detector unit 20 includes an adjustable stand 22 having: a base 22a upon which the stand 22 is balanced; a vertically extending potion 22b rising from the base 22a; and, an elongated head 22c attached to the vertically extending portion 22b at an end opposite the base 22a. The stand 22 has multiple degrees of freedom of movement to adjust the height of the vertically extending portion 22b, and to adjust the tilt, cant, and/or rotation of the elongated head 22c. Optionally, the base 22a has selectively lockable wheels or coasters (not shown) mounted thereunder to facilitate the stand's movement as desired. Additionally, the stand 22 includes locking mechanisms (not shown) that are used to fix the orientation of the stand 22 and prevent further movement about its degrees of freedom. Optionally, the stand 22 is mounted to the patient support 12. This permits the patient support 12 to be turned, raised, lowered, wheeled to another location, or the like, without altering the patient's coordinate system relative to the stand 22. Alternately, the stand 22 is mounted to a pole or other stationary support, the ceiling of the room, or the like.

The stand 22 supports a plurality of receivers 24, such as CCD arrays, IR cameras, light sensitive diodes, other light sensitive receivers, or the like, mounted at fixed, known locations thereon. In a preferred embodiment, as illustrated, two receivers 24 are mounted at opposite ends of the elongated head 22c. Alternately, the receivers 24 receive other types of radiant energy, such as ultrasound, x-ray radiation, radio waves, magnetic waves, or the like.

The receivers 24 detect radiation of the selected type received from passive or active emitters 26 transmitting the same. In this manner, the detection unit 20 resolves or tracks the spatial location of the emitters. The emitters 26 are affixed to different objects to track their location in real space. For example, they are optionally affixed to a surgical tool, such as the illustrated probe or wand 28, a biopsy needle, a needle guide, etc. Accordingly, in real space, the relative orientations and coordinate positions of objects with attached emitters, e.g., wand 28, are calculated, triangulated, or otherwise determined.

Preferably, control and/or coordination of the IGS system 10 is carried out via an operator console 30 housing a computer system 40. Alternately, the computer system 40 can be remotely located and connected with the operator console 30 by appropriate cabling or otherwise. The computer system 40 stores or otherwise accesses 3D image data from which image representations of the subject are selected or otherwise generated for display on video monitors 50 or other appropriate image rendering devices. Optionally, the image representations are two-dimensional (2D) planes or slices selected from, e.g., axial, sagittal, coronal, or oblique planes through a selected point on the subject. Alternately, 3D image representations of the subjects anatomy are depicted. Typically, the image data is obtained via a non-invasive medical diagnostic imaging apparatus such as, e.g., a magnetic resonance imaging (MRI) scanner, a computed tomography (CT) scanner, a gamma or nuclear camera, traditional or fluoroscopy x-ray systems, etc.

Figure 2:
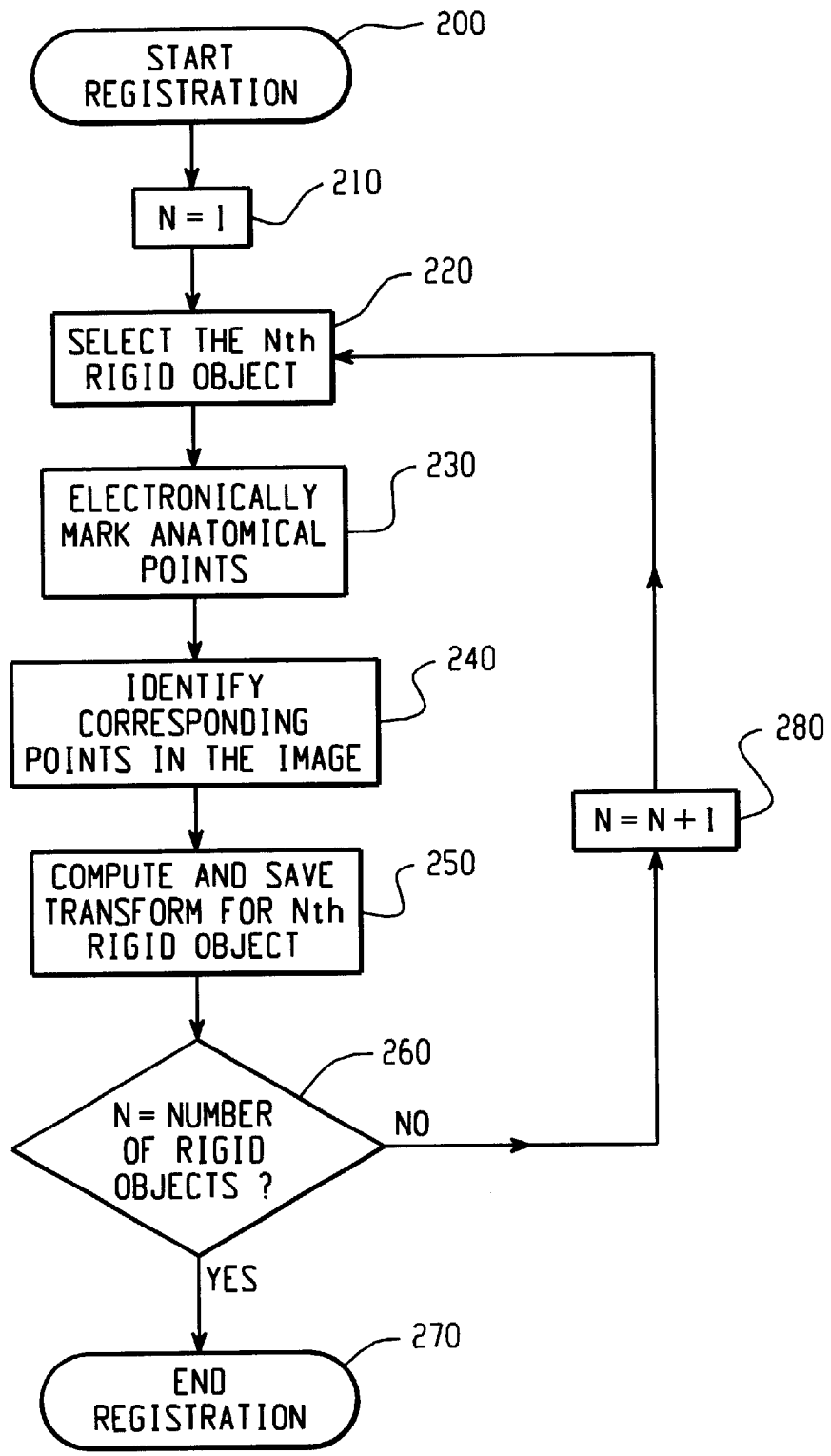
FIG. 2 is a flow chart showing a method of registration between a subject's anatomy in real space and its corresponding image in image space in accordance with aspects of the present invention.

With reference to FIG. 2 and continuing reference to FIG. 1, in a preferred embodiment, registration of the subject's anatomy in real space with images of the same in image space is carried out by separately registering each individual rigid object with its corresponding image within the region of interest of the subject on which the procedure is being performed. The rigid objects are, e.g., the individual vertebrae in the vicinity of a spinal surgery or other like procedure.

The registration process begins at a start registration step 200 initiated by an operator via operator console 30. The start registration step 200 initializes the IGS system 10 in preparation for registration. Next, at step 210, a counter is setup, for example, by designating an arbitrary variable (in the illustrated example, N) as the counter and loading it with or setting it equal to an initial value (in the illustrated example, 1). Thereafter, at step 220, the Nth rigid object in real space is selected for registration with its corresponding image in image space.

The operator then, at step 230, selects and/or electronically marks a plurality of unique anatomical points or sites on the selected Nth rigid object. Generally, three points are used which are distinct and readily identifiable. For example, in the case of vertebrae, the tips of the two traverse processes and the tip of the spinous process are preferably used. In a preferred embodiment, the electronic marking is carried out by touching the end of the wand 28 to the desired points or sites being marked, and recording the coordinate position of the end of the wand 28 in real space as determined by the detector unit 20. Accordingly, the locations in real space of the marked positions or sites in contact therewith are also determined.

Next, at step 240, the location or position of the corresponding points or sites to those which were marked in real space are identified in the image existing in image space and displayed on the video monitors 50. At step 250, a transform which maps the points or sites marked from real space to their corresponding identified locations in image space is computed or otherwise determined and saved.

More specifically, with reference to FIGS. 3A–D and continuing reference to FIGS. 1 and 2, in a preferred embodiment, the positions of the three marked sites 300 in real space defined by, e.g., a Cartesian coordinate system (x, y, z), are compared with the relative positions of their corresponding pixels 300' in image space defined by, e.g., a Cartesian coordinate system (x', y', z'). The translation and rotational relationship between the real space and image space coordinate systems is then determined. Initially, with reference to FIG. 3A, the translation component is determined. That is, the offsets $X_{offset}$, $Y_{offset}$, and $Z_{offset}$ between the barycenters 310 and 310' of the triangles defined by the coordinates of the three points in real and image spaces, respectively, are determined. This provides a translation or an offset in the x, y, and z-directions between the two coordinate systems. The values of $X_{offset}$, $Y_{offset}$, and $Z_{offset}$ are added or subtracted to the coordinates of the real space and the coordinates of image space, respectively, to translate between the two.

Figures 3A, 3B:
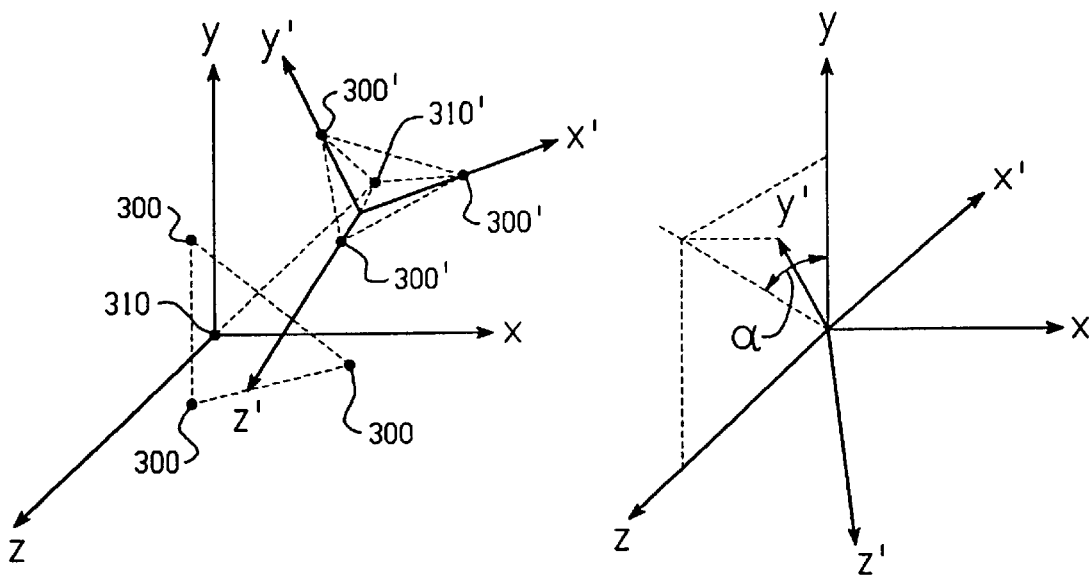
FIGS. 3A–D are diagrammatic illustrations showing a coordinate transform between a coordinate system of real space and image space in accordance with aspect of the present invention.
Figures 3C, 3D:
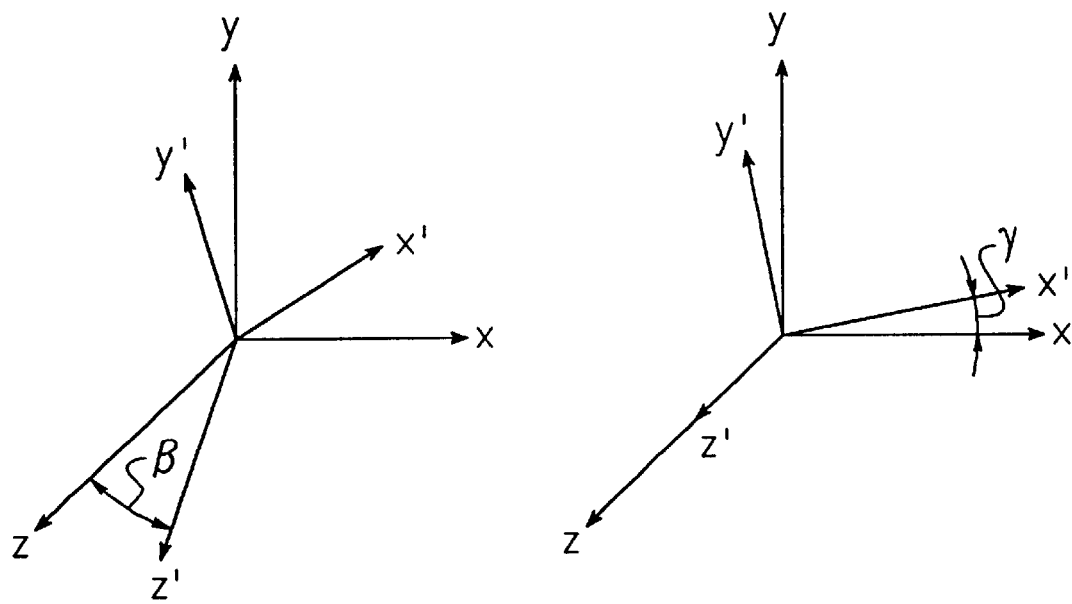

With reference to FIG. 3B, translating the origins of the two coordinate systems into alignment, however, does not complete the transform. Rather, the coordinate systems are also rotated relative to each other about all three axes whose origin is at the now coincident barycenter. As illustrated in FIGS. 3B–D, the angles of rotation ($\alpha$, $\beta$, $\gamma$) in the (y, z), (x, z), and (x, y) planes are determined. Having made these determinations, it is a simple matter to transform the real space coordinates into the image space coordinates and, conversely, to rotate the image space coordinates into real space coordinates. In this manner then, the transform for the Nth rigid object is calculated or otherwise determined.

With reference again to FIG. 2, at determination step 260 it is determined whether or not N equals the total number of rigid objects being individually registered. If at determination step 260 the outcome of the query is true or yes, then all the rigid objects have been registered and the process branches to a termination step 270 where the registration process is ended. On the other hand, if at determination step 260 the outcome of the query is false or no, then the counter is incremented at step 280 and the process repeated starting at step 220 for the next rigid object. The process is repeated until all the desired rigid objects in real space have been individually registered to their respective counter part images in image space, with the corresponding transform for each rigid object being determined and saved.

In an alternate embodiment, registration of each rigid object is carried out using a surface to which a cloud of points are fit. That is to say, a surface on the rigid object being registered is identified in the image using, for example, thresholding or another similar technique. Then, a cloud of arbitrary points (i.e., multiple points, e.g., 10 to 20 or more) are electronically marked on the corresponding rigid object in real space. The cloud of points are then fit to the selected surface to complete the registration of that rigid object.

In operation, during an interventional or medical procedure, the position and orientation of a surgical tool (e.g., the wand 28) is tracked in real space via the detection unit 20. In accordance with the registration between real space and image space, a graphic representation of the surgical tool is accurately mapped to its corresponding position and orientation in image space where it is visualized along with the image representation of the subject via the video monitors 50. In this manner then, interventionalists or other medical personnel viewing the video monitors 50 are aided in navigating through and/or around various anatomical structures.

Figure 4:
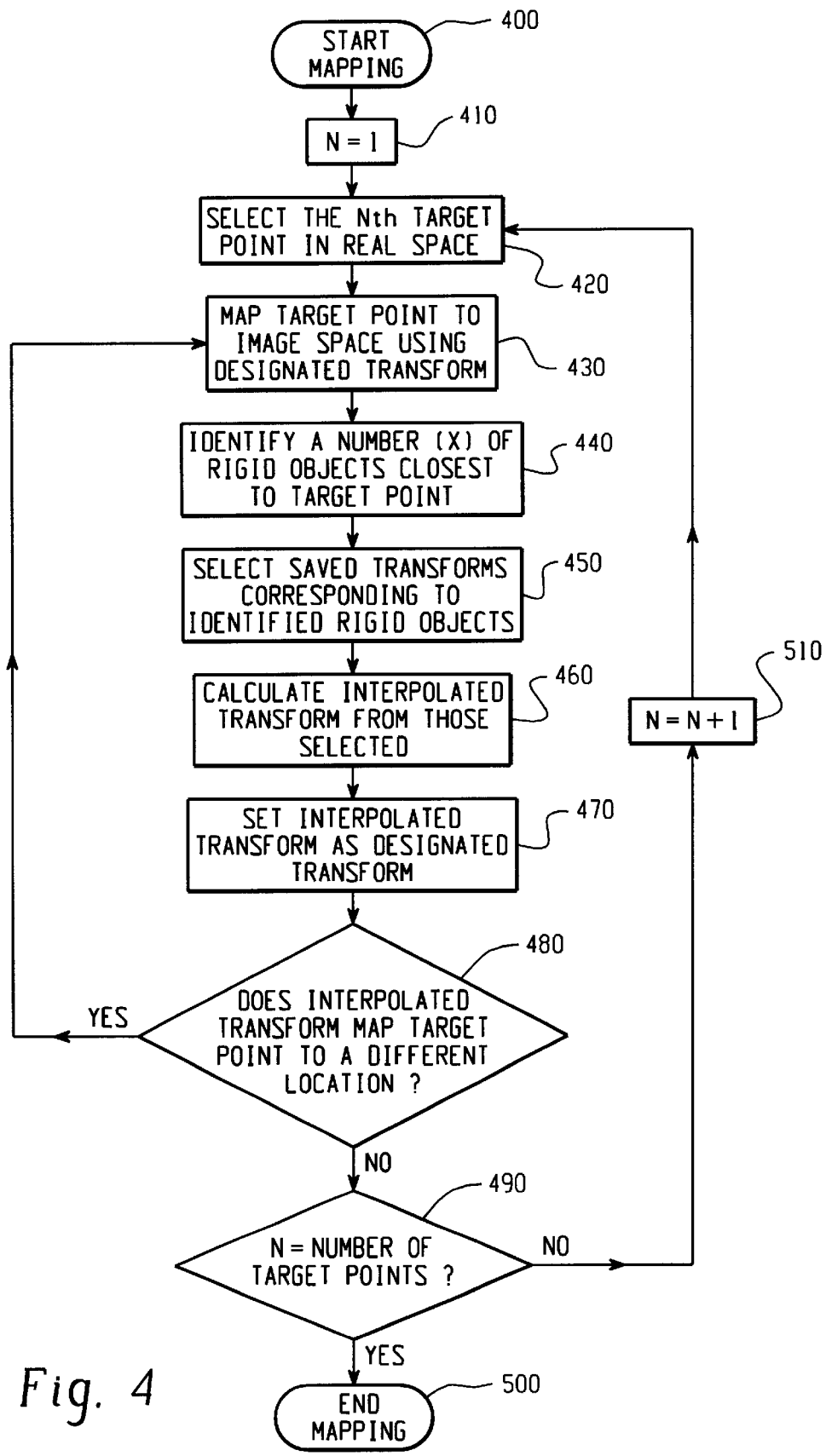
FIG. 4 is a flow chart showing a method of mapping selected target points in real space to their corresponding locations in image space in accordance with aspect of the present invention.

More specifically, with further reference to FIG. 4, the mapping process begins at a start mapping step 400 initiated by an operator via operator console 30. The start mapping step 400 initializes the IGS system 10 in preparation for mapping. Next, at step 410, a counter is setup, for example, by designating an arbitrary variable (in the illustrated example, N) as the counter and loading it with or setting it equal to an initial value (in the illustrated example, 1). Thereafter, at step 420, the Nth target point in real space is selected for mapping to its corresponding point in image space. In a preferred embodiment, for example, the selected target point optionally corresponds to where the tip or end of the wand 28 is detected via detector unit 20. Optionally, additional target points are selected in turn and mapped to image space. The additional target points preferably correspond to other significant features or points of interest on the wand 28, or other tracked surgical tool, such that when mapped collectively to image space, the target points define a frame of reference from which a graphical representation of the surgical tool can be accurately rendered or visualized in image space along with the subject's anatomy in a relative position and orientation substantially the same as that in real space.

Next, at step 430, the Nth target point is mapped to image space using a previously designated transform. In the case of the first or initial mapping, the designated transform is arbitrarily or otherwise selected from those transforms generated and saved during the registration process. Alternately, a predetermined generic transform is used, or a particular initial transform calculated or interpolated from one or more predetermined or otherwise selected saved transforms is used.

In any event, thereafter, at step 440, a number (arbitrarily designated by the variable X, where X is a whole number greater than or equal to 1) of rigid objects closest to the target point are identified. In a preferred embodiment, X is equal to a predetermined value, e.g., 3. Optionally, the value of X is selected by the operator or otherwise tuned for the particular procedure being performed and the particular anatomy of interest. Additionally, the value of X is optionally determined and varied according to the relative position of the selected target point. For example, when the selected target point is directly on (or very near) a rigid object, X is optionally set equal to 1 such that (as more fully detail below) only the single saved transform used to register that rigid object is used in mapping the target point.

At step 450, the saved transforms corresponding to the identified rigid objects are selected, and then, at step 460, an interpolated transform is calculated from those transforms selected. The interpolated transform is set as the designated transform for future mappings at step 470. In a preferred embodiment, the interpolation is nearest neighbor interpolation. Alternately, a linear or higher order interpolation is employed.

At decision step 480, it is determined if the newly designated interpolated transform would map the currently selected target point to a location different from its presently mapped location in image space. If the determination is affirmative or yes, the mapping process loops back to step 430 for re-mapping of the target point using the new designated transform. On the other hand, if the determination is negative or no, the mapping process continues on to decision step 490.

At decision step 490, it is determined if N equals the total number of target points to be mapped. If the determination is affirmative or yes, then all the target points have been mapped and the process branches to a termination step 500 where the mapping process is ended. On the other hand, if the determination is negative or no, then the counter is incremented at step 510 and the process repeated starting at step 420 for the next target point. In this manner, the mapping process is repeated until all the desired target points in real space have been mapped to their respective locations in image space.

In a preferred embodiment, each of multiple target points which define the wand 28 (or other surgical tool) in real space is mapped to image space using its own interpolated transform generated in accordance with the individual target point's position relative to the registered rigid objects. Accordingly, when the registered rigid objects are not in the same relative spatial relationship with one another as they were when imaged, the resulting graphical representation of the wand 28, or other surgical instrument, as visualized on the monitors 50, in image space appears deformed relative to its counterpart in real space. That is to say, due to their spatial separation, the target points potentially have different sets of closest rigid object. Consequently, the interpolated transform calculated for each target point is potentially based on a different set of saved transforms. In this manner, the relative orientation and position of a target point with respect to the subject's anatomy in the vicinity of that target point is preserved in the mapping procedure.

Figure 5A:
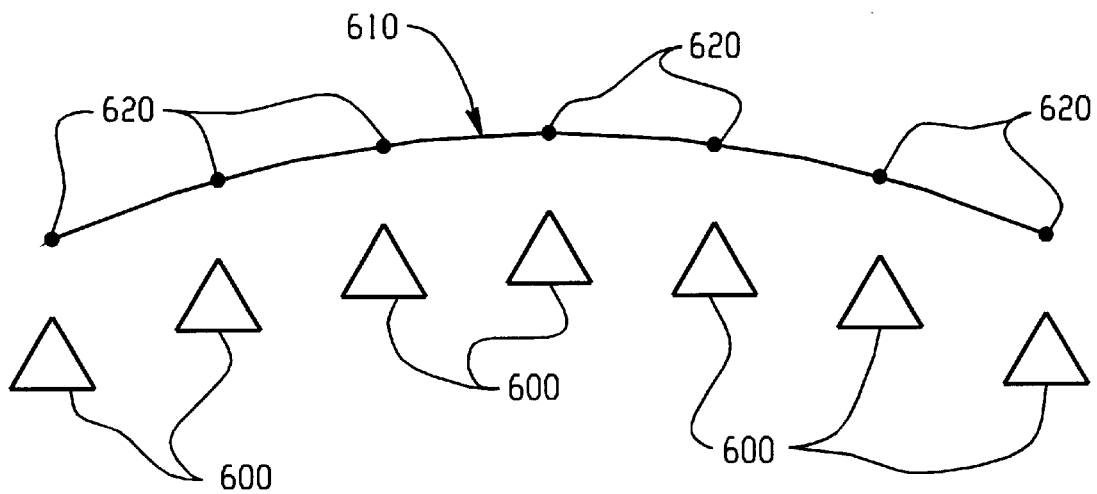
FIG. 5A is a diagrammatic illustration of the visualization in image space of a surgical instrument in relation to rigid objects of a subject's anatomy in accordance with aspects of the present invention; and, FIG. 5B is a diagrammatic illustration corresponding to FIG. 5A representing the depiction therein in real space.
Figure 5B:
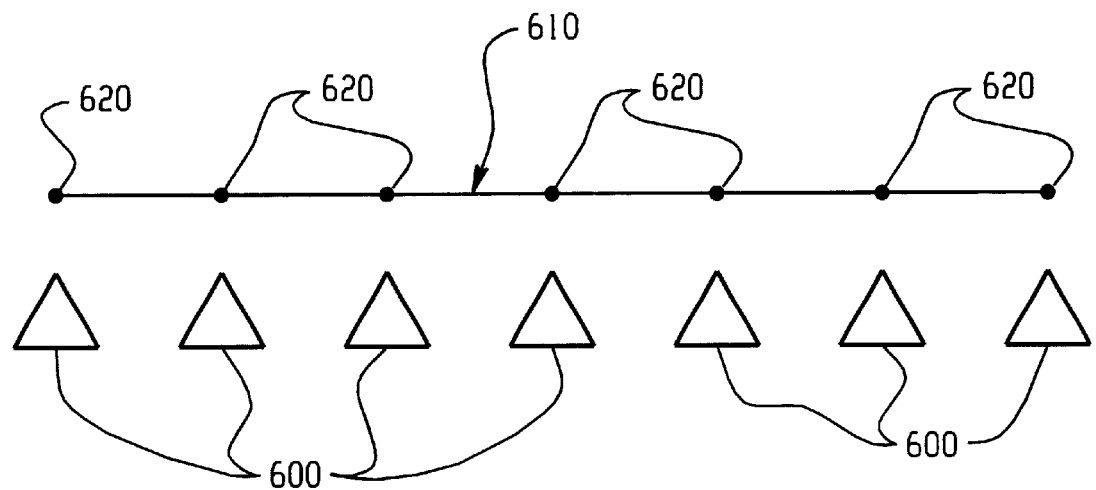

For example, with reference to FIGS. 5A and 5B, the registered rigid objects 600 may have been arranged in an arc when imaged as shown in FIG. 5A representing image space, and are in alignment for the procedure as shown in FIG. 5B representing real space. Accordingly, in real space, a straight surgical tool or instrument 610 tracked by the detector unit 20 is defined by target points 620. However, in image space, the instrument 610 appears arced so that when visualized the individual target points 620 optimally maintain their relative orientation and position with respect to nearby anatomy (e.g., the rigid objects 600).

In an alternate embodiment, the multiple target points are mapped to image space using the same interpolated transform such that a graphical representation of the wand 28 is visualized on the video monitors 50 having substantially the same relative location and orientation as the wand 28 has in real space. In this manner, the visualized image of the wand 28 appears substantially the same as the actual wand 28 due to the fact that the relative spatial relationships between the target points is maintained through the use of the same interpolated transform for each of their mappings.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of mapping a chosen point in real space to its corresponding location in image space, the method comprising:

(a) obtaining a diagnostic medical image or a subject including multiple rigid objects;

(b) individually computing separate transforms which register each of the rigid objects in real space with their corresponding locations in image space;

(c) choosing a target point in real space;

(d) mapping the target point to image space using a designated transform;

(e) selecting a number of the rigid objects which are closest to the target point in image space;

(f) generating an interpolated transform from the separate transforms which correspond to the selected rigid objects;

(g) re-mapping the target point in image space using the interpolated transform; and, (h) setting the interpolated transform as the designated transform for subsequent mappings.

2. The method according to claim 1, wherein the interpolated transform is generated in step (f) using nearest neighbor interpolation.

3. The method according to claim 1, wherein the number of rigid objects selected in step (e) is two.

4. The method according to claim 1, wherein the number of rigid objects selected in step (e) is one.

5. The method according to claim 1, wherein the method is repeated for multiple target points such that each target point is ultimately mapped to image space using its own corresponding interpolated transform.

6. The method according to claim 5, wherein the target points selected define a surgical tool in real space.

7. The method according to claim 6, further comprising:
rendering an image representation of the surgical tool in image space in accordance with where the target points are mapped to in image space.

8. The method according to claim 1, wherein step (c) through (f) are repeated for multiple target points that define a surgical tool in real space, said method further comprising:
displaying an image representation of the surgical tool in image space such that if a relative spatial relationship between the multiple rigid objects in real space does not match that of the multiple rigid objects in image space, then the image representation of the surgical tool in image space appears deformed in relation to the surgical tool in real space.

9. The method according to claim 8, wherein a relative spatial relationship of each target point to its nearest rigid object in image space is substantially identical to that of each target point to its nearest rigid object in real space.

10. A method of mapping surgical tools in real space to a warped image space, the method comprising:
(a) obtaining a diagnostic medical image of a subject including multiple rigid objects, the medical image having has at least one deformed region;
(b) individually computing separate transforms which register each of the rigid objects in real space with their corresponding locations in the warped image space, the transforms accounting for the at least one deformation;
(c) positioning a surgical tool in real space;
(d) mapping target points which define the surgical tool in real space to the warped image space using the transforms to map the surgical tool into the warped image space; and,
(e) displaying an image representation of the surgical tool in the warped image space, such that the image representation of the surgical tool in the warped image space appears deformed in relation to the surgical tool in real space.

11. The method according to claim 10, wherein a relative spatial relationship of each target point to its nearest rigid object in image space is maintained substantially the same as that of each target point to its nearest rigid object in real space.

12. An image guided surgery system comprising:
a support on which a subject is positioned in real space;
a human viewable display on which is rendered, in an image space, an image representation of anatomy of the subject, said anatomy including a plurality of rigid objects;
a surgical tool having points thereon from which radiant energy is directed;
a detector unit which tracks an orientation and position of the surgical tool in real space via the radiant energy directed therefrom; and,
a processor which maps the orientation and position of the surgical tool from real space into image space using an interpolated transform, said interpolated transform being interpolated from a number of rigid object transforms which each register one of the plurality of rigid objects in real space to its corresponding image in image space.

13. The image guided surgery system according to claim 12, wherein, in accordance with the processor's mapping, the surgical tool is visualized on the human viewable display along with the image representation of anatomy of the subject.

14. The image guided surgery system according to claim 12, wherein the interpolated transform is interpolated from those rigid object transforms corresponding to a number of the rigid objects closest to where the surgical tool is being mapped to by the processor.

15. The image guided surgery system according to claim 14, wherein the interpolated transform is interpolated using nearest neighbor interpolation.

16. The image guided surgery system according to claim 12, wherein the rigid objects are vertebrae.

17. The image guided surgery system according to claim 12, wherein the surgical tool, in accordance with the processor's mapping, is also visualized on the human viewable display along with the image representation of anatomy of the subject, such that as visualized on the human viewable display, the surgical tool is deformed to compensate for differences in relative spatial positioning between the rigid objects in real space as compared to image space.

18. An image guided surgery system comprising:
an area in which a subject is positioned in real space;
a surgical tool having points thereon from which radiant energy is directed;
a detector unit which tracks the surgical tool in real space via the radiant energy directed therefrom;
a processor which maps the surgical tool from real space into at least a warped portion of image space using a plurality of spatial mapping transforms, the transforms accounting for a warping of the warped portion of the image space, said transforms each registering one of a plurality of rigid objects in real space the warped portioned of image space; and,
a human viewable display on which is rendered, in image space, an image representation of anatomy of the subject and an image representation of the surgical tool, wherein, as visualized on the human viewable display, the surgical tool is deformed in the warped portion of image space to compensate for differences in relative spatial positioning between the rigid objects in real space as compared to the warped region of image space.

19. A method of mapping a chosen point in real space to a corresponding location in image space, the method comprising:
(a) obtaining a diagnostic medical image of a subject including multiple rigid objects;
(b) individually computing separate transforms which register each of the rigid objects in real space with their corresponding locations in image space;
(c) choosing a target point in real space;
(d) selecting a number of the rigid objects which are closest to the target point;
(e) generating an interpolated transform from the separate transforms which correspond to the selected rigid objects; and,
(f) mapping the target point in image space using the interpolated transform without spatially transforming the diagnostic medical image.

* * * * *